(12) United States Patent
Butcher

(10) Patent No.: US 6,182,825 B1
(45) Date of Patent: Feb. 6, 2001

(54) HOLDER FOR A PLANAR DATA STORAGE MEDIUM

(75) Inventor: Sean Butcher, Burley (GB)

(73) Assignee: Digisox Limited, Wiltshire (GB)

(*) Notice: Under 35 U.S.C. 154(b), the term of this patent shall be extended for 0 days.

(21) Appl. No.: 09/284,599

(22) PCT Filed: Oct. 24, 1997

(86) PCT No.: PCT/GN97/02900

§ 371 Date: Oct. 6, 1999

§ 102(e) Date: Oct. 6, 1999

(87) PCT Pub. No.: WO98/19305

PCT Pub. Date: May 7, 1998

(30) Foreign Application Priority Data

Oct. 26, 1996 (GB) .................................................. 9622316
Oct. 14, 1997 (GB) .................................................. 9721793

(51) Int. Cl.⁷ .................................................. B65D 85/57
(52) U.S. Cl. ........................................ 206/308.1; 206/493
(58) Field of Search ............................... 206/308.1, 309, 206/310, 387.12, 493

(56) References Cited

U.S. PATENT DOCUMENTS

| 4,645,075 | 2/1987 | Van der Lely . |
| 5,096,064 | 3/1992 | Rufo, Sr. et al. . |
| 5,505,299 | * 4/1996 | Ditzig et al. ............... 206/308.1 |
| 5,540,328 | * 7/1996 | Kohtake ..................... 206/308.1 |
| 5,944,180 | * 8/1999 | Koh et al. .................. 206/308.1 |

FOREIGN PATENT DOCUMENTS

| 0 267 547 A1 | 11/1987 | (EP) . |
| 0 493 845 A2 | 7/1992 | (EP) . |
| 0 564 155 A2 | 10/1993 | (EP) . |
| 0 593 318 A2 | 4/1994 | (EP) . |
| 2 226 810 | 7/1990 | (GB) . |
| 2 272 886 | 6/1994 | (GB) . |
| 90/04549 | 5/1990 | (WO) . |
| 95/05661 | 2/1995 | (WO) . |
| 95/17752 | 6/1995 | (WO) . |
| 96/17352 | 6/1996 | (WO) . |

* cited by examiner

Primary Examiner—David T. Fidei
(74) Attorney, Agent, or Firm—Renner, Otto, Boisselle & Sklar LLP

(57) ABSTRACT

The present invention provides a holder for a planar data storage medium, comprising a first opening through which the planar data storage medium is insertable into a storage area of the holder in an insertion direction within the plane of the planar data storage medium. Further, a retaining mechanism is provided which is resiliently biased to resist removal of the planar data storage medium from the storage area in a direction opposite to the insertion direction. However, the holder is configured to enable a pressure to be applied to the planar data storage medium to overcome the bias of the retaining mechanism, thereby allowing the planar data storage medium to be removed via the first opening in the holder. This approach enables the holder of the present invention to have a simpler construction and a significantly thinner profile than typical prior art holders.

13 Claims, 4 Drawing Sheets

HOLDER FOR A PLANAR DATA STORAGE MEDIUM

FIELD OF THE INVENTION

The present invention relates to holders for data storage media, and more particularly to holders for planar data storage media.

BACKGROUND OF THE INVENTION

There are currently many different types of planar data storage media available, for example Compact Discs (CDs), CDROMs, floppy discs, diskettes, records, etc. To enable these planar data storage media to be safely stored, or to be packaged for transportation, holders have been developed for retaining the storage media.

Taking CDs or CDROMs as an example, a typical holder for a CD or a CDROM typically consists of two parts, both of which are rectangular in shape. The first part is adapted to receive a plastic insert in which a recess is provided to define a circular disc receiving portion. In the center of the recess, a circle of small resilient plastic fingers, for example eight fingers, are provided. A compact disc can then be located in the recess such that the fingers protrude through a circular hole provided in the center of the compact disc, the fingers then applying a gripping force to hold the compact disc in place.

There are many different configurations for the fingers provided in the center of the disc receiving recess. However, generally, they are arranged such that, in order to remove the compact disc, a user applies manual pressure to the top of the fingers to cause them to deform inwardly, thereby allowing the compact disc to be removed.

The second part of the holder preferably has two depending side arms which are arranged so as to locate along one edge of the first part of the holder to provide a hinge-type connection, whereby the second part can be rotated relative to the first part to define open and closed configurations of the holder. Hence, when a compact disc has been stored in the circular recess of the first part, the second part can be rotated so as to close on the first part, thereby completely enclosing the compact disc between the rectangular first and second parts of the holder. In addition, the second part can be configured such that it is able to hold a booklet, the booklet and compact disc being fully enclosed within the holder when the holder is in the closed configuration.

The above type of compact disc holder is a mass produced item, used widely in large volumes. However, this form of CD holder has a number of drawbacks. Firstly, it is made from a number of separate parts which then have to be assembled together, thus increasing the cost of manufacture. Secondly, there are a number of positions of structural weakness in the design. For example, the arms that depend from the second part so as to hingedly connect the second part to the first part can be damaged, or even broken. Similarly, the small plastic fingers in the center of the disc receiving recess are also liable to damage or breakage, this reducing the gripping force used to retain the compact disc in position. Another problem is that this type of holder is relatively bulky, compared with the actual dimensions of the compact disc being held within the holder. This is particular disadvantageous when the CDs or CDROMs are to be transported, or, as is becoming more common, when the CDs are to be provided with a book or magazine, and hence need to be mounted on the book or magazine.

It is an object of the present invention to provide a holder for a planar data storage media which alleviates the above-mentioned problems with the prior art holder.

SUMMARY OF THE INVENTION

Viewed from a first aspect, the present invention provides a holder for a planar data storage medium comprising: a first opening through which the planar data storage medium is insertable into a storage area of the holder in an insertion direction within the plane of the planar data storage medium; a retaining mechanism resiliently biased to resist removal of the planar data storage medium from the storage area in a direction opposite to the insertion direction; and the holder being configured to enable a pressure to be applied to the planar data storage medium to overcome the bias of the retaining mechanism, thereby allowing the planar data storage medium to be removed via the first opening in the holder.

In accordance with the present invention, a first opening in the holder is provided, such that the planar data storage medium is insertable into the holder in an insertion direction within the plane of the planar data storage medium. A retaining mechanism is then provided which is resiliently biased to resist removal of the planar data storage medium from the holder in a direction opposite to the insertion direction. The holder is then configured to enable a pressure to be applied to the planar data storage medium to overcome the bias of the retaining mechanism, thereby allowing the planar data storage medium to be removed via the first opening in the holder. Hence, the holder has a simpler construction than the above-described prior art holders, and is more user-friendly.

In preferred embodiments, the holder is configured to provide a second opening for enabling a manual pressure to be applied to the planar data storage medium to overcome the bias of the retaining mechanism, thereby allowing the planar data storage medium to be removed via the first opening in the holder. This second opening is preferably of a size which enables a user's finger to be inserted into the holder so as to contact a surface of the data storage medium. The user can then apply a force to the data storage medium so as to urge the data storage medium towards the first opening, this force being sufficient to overcome the bias of the retaining mechanism and thereby allow the planar storage medium to be removed via the first opening in a direction opposite to the insertion direction.

In preferred embodiments, the first opening comprises a slot, the slot preferably being dimensioned so as to have dimensions similar to, but somewhat larger than, the cross-sectional dimensions of the planar data storage medium. However, the first opening need not be a fully enclosed slot. For example, a generally slot-like opening can be provided, but with one of the surfaces defining the slot having a gap provided therein.

Preferably, the holder further comprises a guide to guide the planar data storage medium along the insertion direction as it is inserted through the first opening. In preferred embodiments, the interior of the holder is shaped so as to maintain the narrow width provided by the slot-like first opening, and the guide comprises one or more interior surfaces of the holder.

A planar data storage medium such as a compact disc typically has an information bearing region on one side of the planar data storage medium. Hence, in preferred embodiments, the guide comprises one or more shoulders arranged to act on an edge region of the planar data storage medium so as to maintain a gap between an information bearing region of the planar data storage medium and an interior surface of the holder. By maintaining a gap between the information bearing region of the planar data storage medium and a corresponding interior surface of the holder, the likelihood of damaging the information bearing region of the planar data storage medium as it is inserted and removed from the holder is significantly reduced.

In preferred embodiments, the retaining mechanism comprises one or more protrusions resiliently biased to a blocking configuration in which the one or more protrusions project inwardly within the holder to restrict the passage of the planar data storage medium between the first opening and the storage area, the protrusions being arranged to change from the blocking configuration to a non-blocking configuration to allow the planar data storage medium to move between the first opening and the storage area.

Preferably, the protrusions are arranged to change from the blocking configuration to the non-blocking configuration under insertion or removal pressure when contacted by the planar data storage medium to allow the planar data storage medium to move between the first opening and the storage area. Hence, as the planar data storage medium is inserted into, or removed from, the holder, it will contact the one or more protrusions and apply a pressure on those one or more protrusions sufficient to change those protrusions from the blocking configuration to the non-blocking configuration.

The one or more protrusions may be formed separately from the holder, and then mounted within the holder such that the entire protrusion moves relative to the walls of the holder when changing between the blocking configuration and the non-blocking configuration. However, in preferred embodiments, each one or more protrusions is formed from a deformable strip of material located at its ends on an interior surface of the holder, the strip of material being deformable from the blocking configuration to the non-blocking configuration under the insertion or removal pressure when contacted by the planar data storage medium. Hence, in preferred embodiments, rather than having a separate rigid protrusion which moves relative to the holder, a deformable strip of material is provided which is located at its ends on the interior surface of the holder, such that when force is applied on the strip of material by the planar data storage medium, the strip of material deforms so as to adopt the non-blocking configuration.

In an alternative preferred embodiment, each one or more protrusions is formed from two deformable strips of material, each deformable strip being located at one of its ends on an interior surface of the holder, whereas the other ends of the two deformable strips are separated from each other by a gap, the strips of material being deformable from the blocking configuration to the non-blocking configuration under the insertion or removal pressure when contacted by the planar data storage medium. Providing two deformable strips of material to form each protrusion, rather than a single strip of material, may, depending on the material used, provide for a more ready deformation of the protrusion when contacted by the planar data storage medium. Further, such an approach may increase the operating life of the protrusions, and hence of the holder.

It will be appreciated by those skilled in the art that the strip of material may be formed from any suitable material, for example a thin strip of metal, plastic, rubber, etc. However, in preferred embodiments, the deformable strip is a strip of plastic material.

It will be appreciated that any number of protrusions may be provided, this being a matter of design choice. Further, the location of the protrusions within the holder can be chosen at will, assuming that they then serve to resist removal of the planar data storage medium from the storage area in a direction opposite to the insertion direction. However, in preferred embodiments, the one or more protrusions comprise two protrusions formed on opposing side walls of the holder. Preferably, these protrusions are positioned at the same distance from the first opening, such that the planar data storage medium applies pressure substantially equally on both protrusions as it is inserted or removed.

In preferred embodiments, the one or more protrusions are made of the same material as the holder, and form an integral part of the holder. This helps to reduce the total number of parts which must be assembled in order to produce the holder. Indeed, in preferred embodiments, the entire holder can be produced from a single piece of material.

In some situations, it is envisaged that it may be desirable for a user to be able to connect a number of the above described holders together. Hence, in preferred embodiments, the holder further comprises first and second complimentary coupling formations located on the exterior of the holder, such that a further holder having said first coupling formation can be coupled to the holder via said second coupling formation, and a further holder having said second coupling formation can be coupled to the holder via said first coupling formation. In preferred embodiments, the first and second coupling members take the form of male and female connectors having mutually cooperating shapes, such that two holders can be connected together by placing the holders together and then twisting one holder relative to the other to locate the male coupling member within the female coupling member.

The holder of the present invention can be used for any planar data storage medium, and will be shaped and dimensioned according to the type of planar data storage medium to be held by the holder. However, in preferred embodiments, the planar data storage medium is a CD or a CDROM.

BRIEF DESCRIPTION OF THE DRAWINGS

The present invention will be described further, by way of example only, with reference to a preferred embodiment thereof as illustrated in the accompanying drawings, in which.

DESCRIPTION OF PREFERRED EMBODIMENT

For the purposes of describing a preferred embodiment of the present invention, a holder for CDs or CDROMs will be described. However, it will be appreciated by those skilled in the art that, subject to suitable shape and dimensional changes, the holder may be used to store any type of planar data storage medium, for example a floppy disc.

Figures 1, 3:
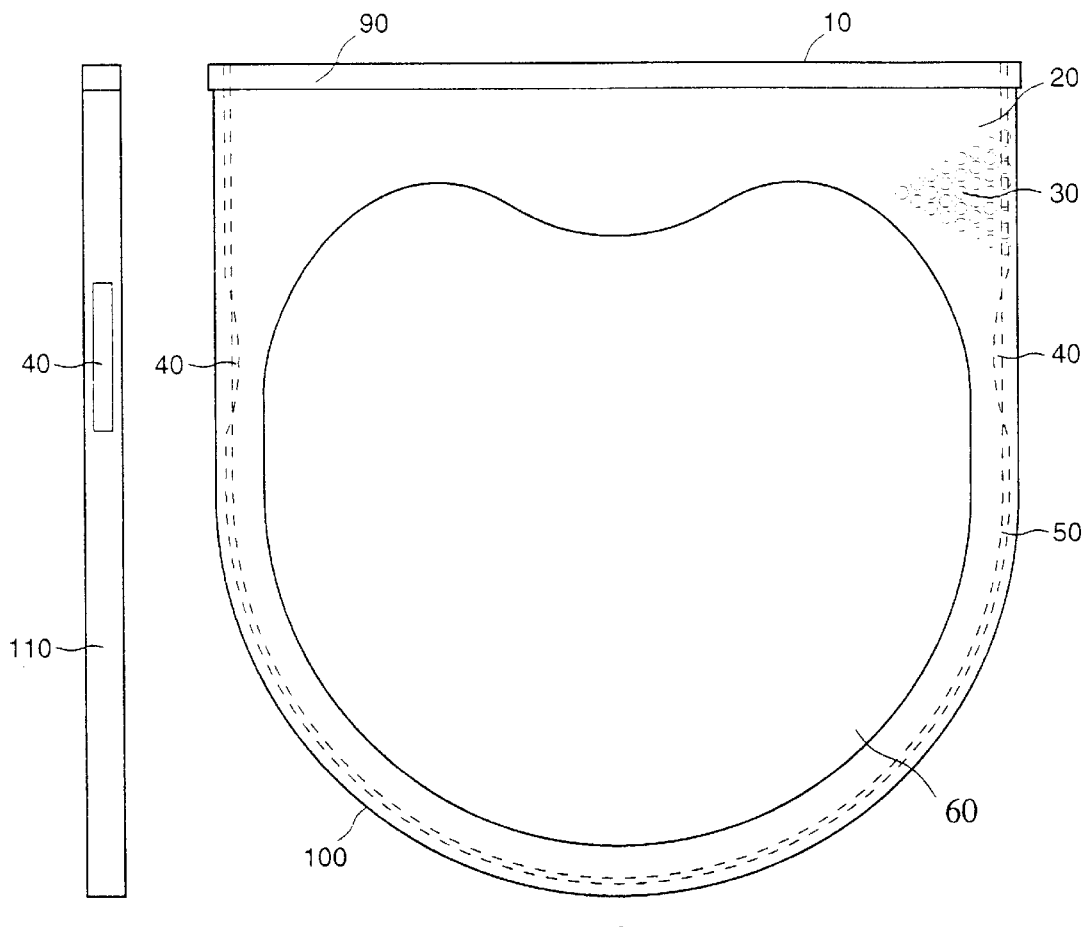
FIG. 1 is a plan view of a holder in accordance with preferred embodiments of the present invention.
FIG. 3 provides a side elevational view of the holder in accordance with preferred embodiments of the present invention.

FIG. 1 illustrates a plan view of a holder in accordance with preferred embodiments of the present invention. The holder 10 comprises a top, planar surface 20, in which is provided a hole 60. In use, the CD will be visible through the hole 60, and a user can apply manual pressure to the CD via the hole 60 in order to remove the CD from the holder via an opening 70, illustrated in FIG. 2.

Figure 2:
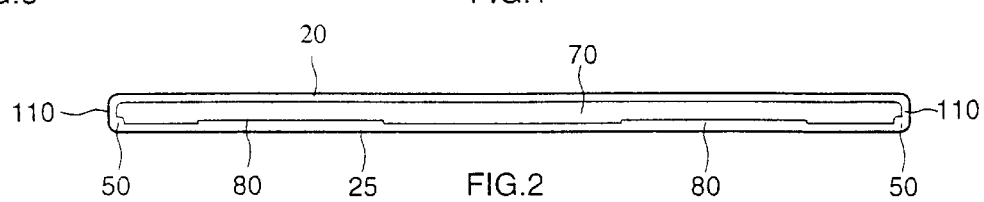
FIG. 2 provides a front elevational view of a holder in accordance with preferred embodiments of the present invention, and illustrates the slot through which the CD or CDROM is inserted and removed.

FIG. 2 is a front elevational view of the holder 10, and illustrates the crosssectional shape of the opening 70 through which the CD is inserted or removed. The holder has a bottom surface 25 of identical shape to the top surface 20, but without the provision of the hole 60. As a CD is inserted through the opening 70, it is generally guided to move in an insertion direction within the plane of the CD by the top and bottom surfaces 20 and 25 of the holder 10. However, to protect the information bearing surface of the CD, a shoulder 50 is provided which preferably runs all the way round the edge of the interior of the bottom surface 25, this shoulder 50 being illustrated by a dotted line in FIG. 1. During insertion or removal of the CD, the edge of the CD rests on the shoulder 50, the shoulder 50 acting to guide the CD as it is inserted into or removed from the holder. Since the CD rests on the shoulder 50, its information bearing surface is raised above the bottom surface 25 of the holder, thereby preventing any possible damage that may be caused as a result of sliding the information bearing surface over the lower surface 25 of the holder.

In preferred embodiments, the holder 10 can be configured to allow a booklet to be inserted in to the holder through the opening 70 in addition to the data storage medium. In such embodiments, ridges 80 may be provided on the interior of the lower surface 25 close to the opening 70, these being used to retain the booklet in position.

Further, although not illustrated in the figures, a soft material can be provided on the interior of holder, for example on the lower surface 25, to clean the CD as it is inserted into, or removed from, the holder.

On the top 20 and bottom 25 surfaces of the holder, a gripping element 30 may be provided to enable the user to grip the holder whilst inserting or removing a CD. In preferred embodiments, this gripping element 30 is provided by a series of raised, semi-circular, plastic protrusions formed on the surface of the holder. However, it will be appreciated by those skilled in the art that any suitable gripping element may be provided, for example by use of a material such as rubber attached to a suitable portion of the holder.

The part of the holder 100 furthest from the opening 70 preferably has a curved shape having a radius similar to the radius of the CD to be inserted into the holder. Hence, when the CD is fully inserted into the holder, the edge of the CD abuts against the inner surface of the portion 100 of the holder 10, the CD then being in the storage position within the holder 10. However, the passage of the CD from the opening 70 to the storage position, and vice versa, is inhibited by a pair of protrusions 40 depending from the side wall 110 of the holder. It will be appreciated by those skilled in the art that these protrusions 40 need not depend from the side walls 110 of the holder, but indeed could depend from the upper surface 20 and/or lower surface 25 of the holder. However, this latter approach is considered less desirable since, through prolonged use, the protrusions 40 may mark the upper or lower surfaces of the CD.

The protrusions 40 may be formed separately to the side wall 110 of the holder 10, and then attached during manufacture to the side wall. However, as illustrated in FIG. 3, which provides a side elevational view of the holder 10 of FIG. 1, the the protrusions 40 are preferably formed during manufacture from a portion of the side wall 110.

Figure 4:
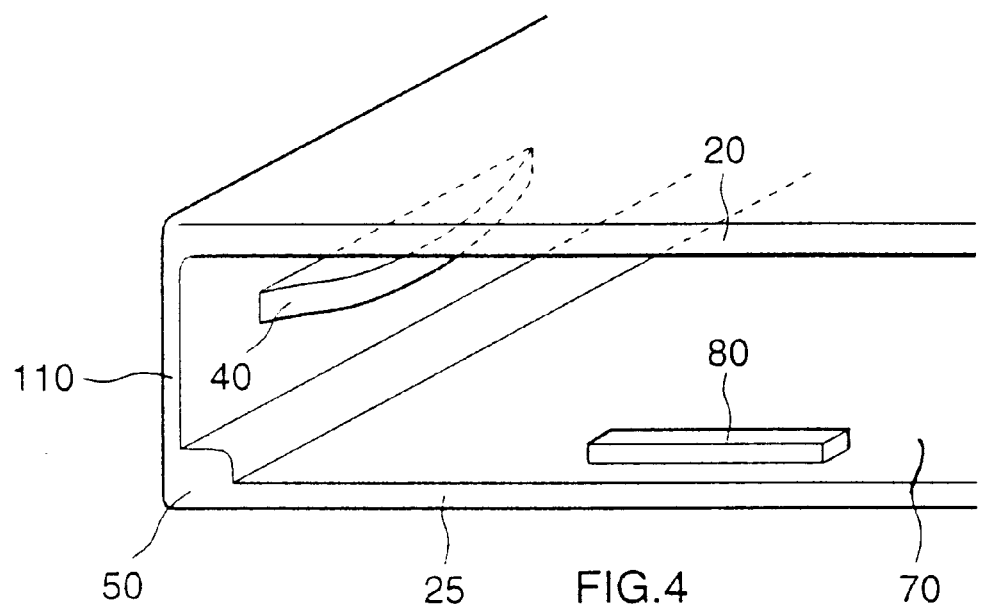
FIG. 4 provides a partial enlarged view of the holder in accordance with preferred embodiments of the present invention, and illustrates a first embodiment of the deformable strip used as a retaining mechanism.

FIG. 4 is a partial, enlarged view of the holder 10, which more clearly illustrates the configuration of the protrusion 40 in accordance with preferred embodiments of the present invention. As illustrated in FIG. 4, the protrusion 40 is preferably formed by a deformable strip produced from the side wall 110 during manufacture. As a CD is inserted through the opening 70, the edge of the CD will contact the protrusion 40, and continued pressure in the insertion direction will cause the protrusion 40 to deform so as to enable the CD to pass via the protrusion 40 into the storage position. Similarly, when a user applies a force to the CD via the opening 60 in the top surface 20, then the CD will contact the protrusion 40 and again cause it to deform so as to allow the CD to pass past the protrusion 40 and out of the holder 10 through the opening 70. As illustrated in FIG. 1, preferably two protrusions 40 are provided on opposite side walls of the holder 10, these protrusions preferably being at the same distance from the opening 70, such that the CD will apply a generally equal pressure to both protrusions 40 as it is inserted or removed.

Figure 5:
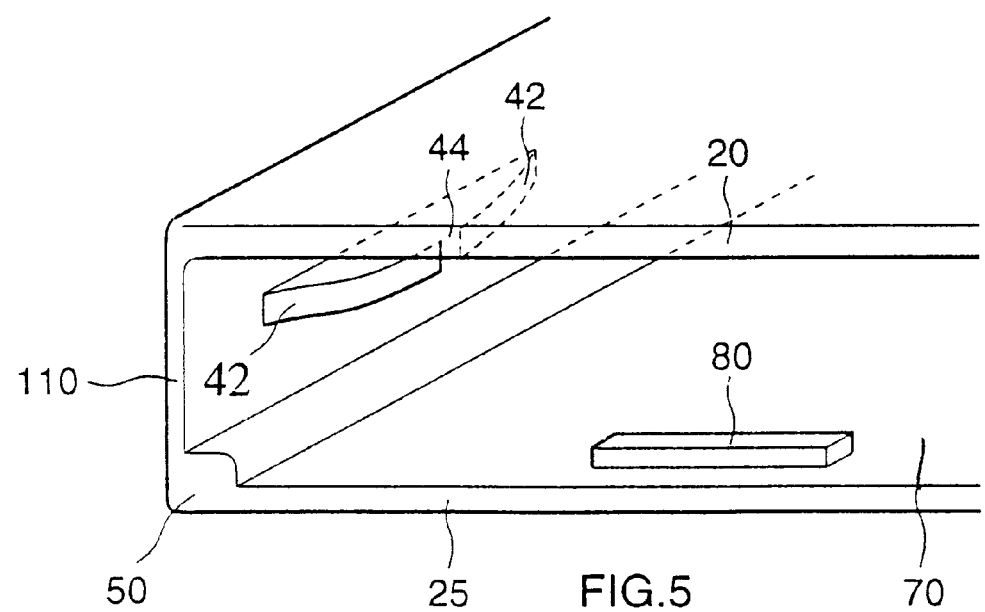
FIG. 5 provides a partial enlarged view of the holder in accordance with preferred embodiments of the present invention, and illustrates a second embodiment of the deformable strip used as a retaining mechanism.

FIG. 5 provides a similar view of the holder to that provided in FIG. 4, but illustrates a second embodiment for the protrusion 40 provided within the holder 10. In accordance with this alternative embodiment, the protrusion 40 is formed from two strips 42 separated by a small gap 44. Again, these two strips are preferably formed during manufacture from portions of the side wall 110. Dependent on the material used to produce the holder, it may be preferable to provide two strips separated by a gap, rather than a single strip, since this may provide better deformation characteristics, and/or prolong the operational life of the protrusion 40, and hence of the holder 10.

Figure 6:
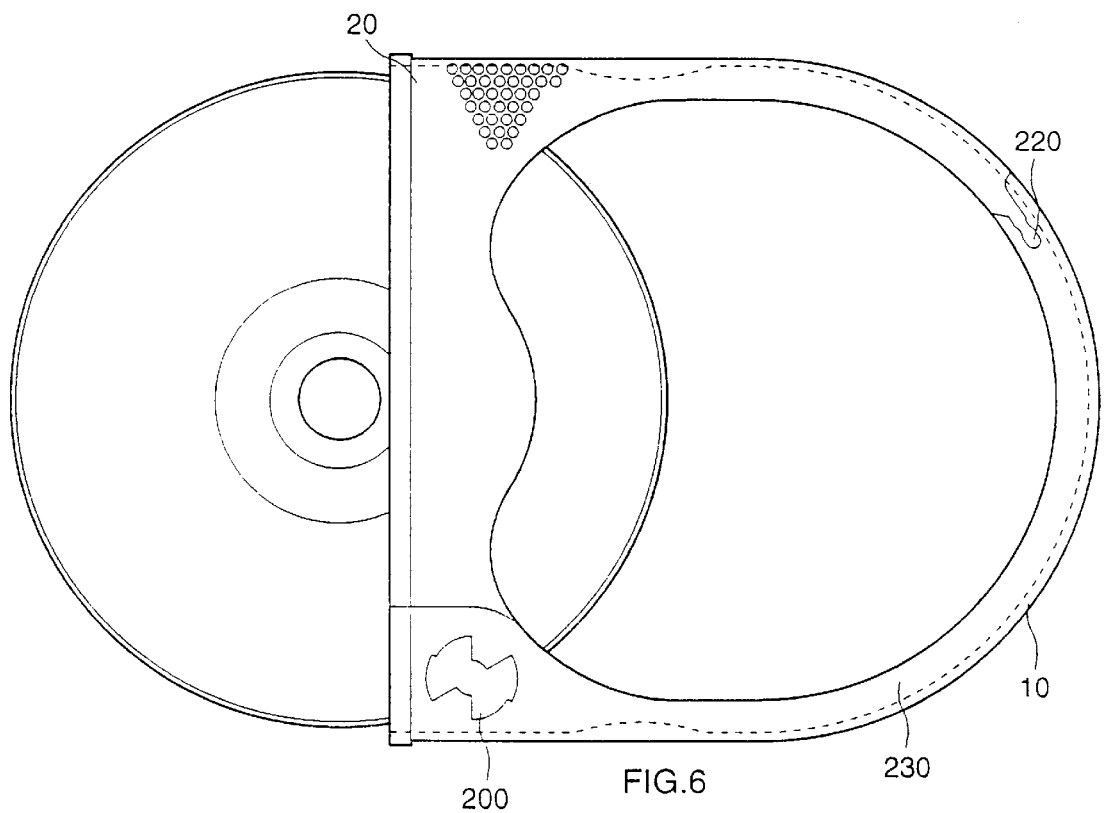
FIGS. 6 and 7 illustrate an alternative embodiment of the present invention, in which coupling members are provided to enable a number of holders to be attached to one another.
Figure 7:
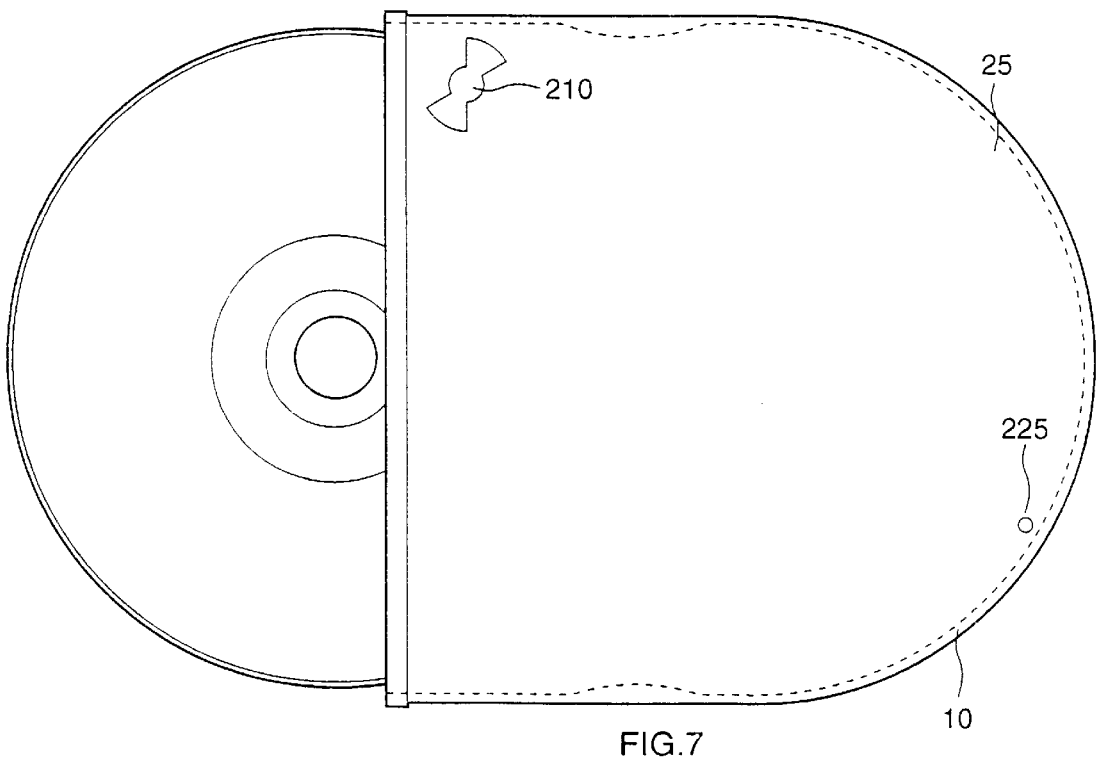

FIGS. 6 and 7 illustrate an alternative embodiment of the present invention, in which the holders 10 are designed to be interlocked together so as to facilitate the storage of a plurality of CDs. In accordance with this embodiment, the upper surface 20 of the holder 10 is provided with a raised portion 230 in which is provided a shaped recess 200 and a channel 220. On the bottom surface 25 of the holder 10, two protrusions are provided, a first protrusion 210 being shaped so as to engage with the recess 200, and a second protrusion 225 being shaped so as to locate in the channel 220. In order to couple two holders together, the bottom surface 25 of one holder is placed adjacent the upper surface 20 of the other holder such that the protrusion 210 on one of the holders engages in the recess 200 on the other holder. Then, one holder is rotated relative to the other until the protrusion 225 on one holder is engaged within the channel 220 on the other holder. By this approach, any number of holders can be connected together to form a structure for holding a plurality of CDs.

Of course, it will be appreciated by those skilled in the art that any other suitable coupling formations may be provided instead of the mechanism illustrated in FIGS. 6 and 7. For example, a single male and female coupling mechanism could be provided.

Figure 8:
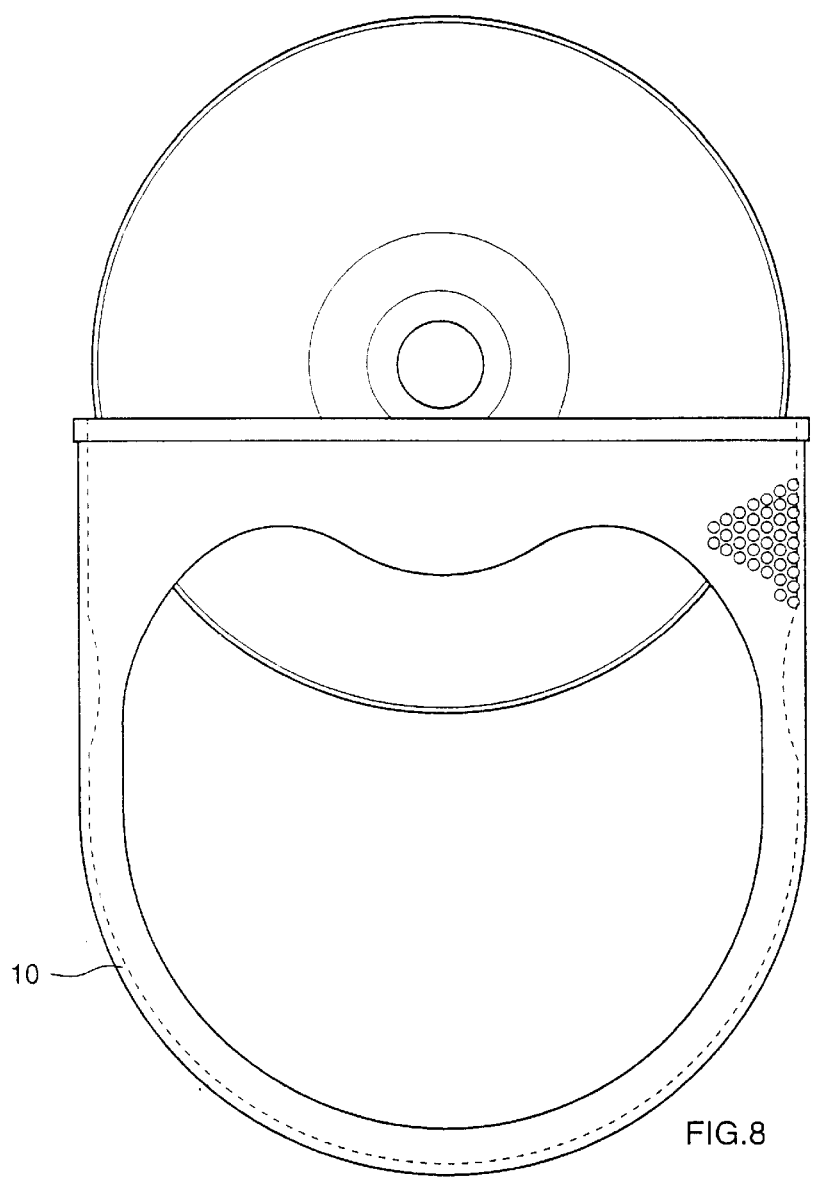
FIGS. 8 and 9 illustrate the holder of preferred embodiments of the present invention with a CD partially and fully inserted, respectively.
Figure 9:
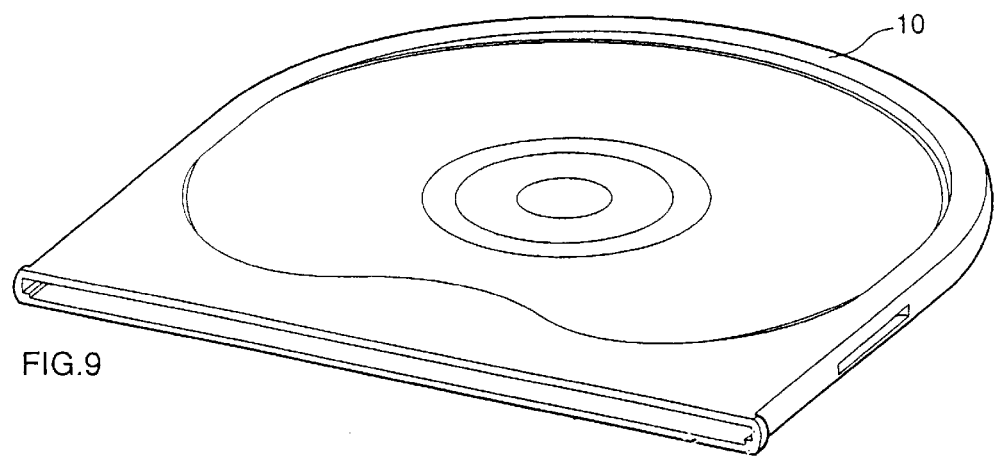

FIGS. 8 and 9 provide further illustrations of the holder of preferred embodiments of the present invention, FIG. 8 illustrating the holder 10 with a CD partially inserted therein, and FIG. 9 illustrating the holder 10 with a CD fully inserted and retained in the storage position.

The holder 10 as described above can be manufactured from any suitable material, but in preferred embodiments is made from a plastic material. It will be apparent that many different forms and grades of plastic may be used together with different colors and color tinted transparent plastics. An example of the plastics that may be used for the purpose of moulding the holder 10 are Butadiene Styrene, K-Resin or BASF Polystyrol, these preferably having impact grade with a good clarity and high gloss, for example Grade 454c or similar.

In addition to allowing a CD to be inserted through the opening, the holder 10 can be dimensioned such that both a CD and an accompanying booklet can be slid into position through the opening 70.

Further, as mentioned earlier, the holder 10 of preferred embodiments can be manufactured as a unitary structure, thereby removing the requirement for a number of different parts to be assembled.

The surfaces of the holder 10 can be embossed, or decorated as desired. Hence, for example, an image can be embossed or raised out of the surface of the holder, and this process can be achieved in a single moulding operation. Further, graphic images such as holograms can be added to the holder's surface. Hence, information bearing holograms can be added for in-store security tagging purposes. In addition, the hole 60 within the upper surface 20 of the holder 10 can be dimensioned so as to allow a large part of the upper face of a CD to be viewed when stored within the holder, thereby allowing the information and graphics on the surface of the CD to be clearly seen. If desired, a card can be inserted into the holder between the CD and opening 60 to protect the surface of the CD, for example during transportation of the CD.

The CD holder 10 as illustrated in FIG. 1 is significantly slimmer than the prior art CD holders used at the current time, and this will enable a significant saving in space when packaging CDs for distribution, since far more CDs can be packed into a particular size box when using the CD holder 10 of preferred embodiments of the present invention. This saving in space will then reduce the transit costs.

The curved portion 100 of the holder 10 of preferred embodiments ensures that the holder 10 has a reduced size compared with the typical prior art CD holder, and this has the advantage that when the CD holder is mounted on the front cover of a magazine, it obscures far less of the front cover of the magazine than would the typical prior art CD holder.

A further advantage of the holder 10 illustrated in FIG. 1 is that it can be manufactured by using any number of injection moulding tools which allow quick and high volume manufacturing.

Hence, in summary, a holder has been described which enables single or multiple CD's or CD-ROM's to be stored for the purpose of any of the following:
1. Storage.
2. Packaging.
3. Mailing/direct mail.
4. Packaging for the music industry.
5. The protection of CD material.
6. Protection from scratching.
7. Displaying graphics and images either on the outside of the product or by the means of information inserted into it.
8. Distribution of computer related software and demo shareware.
9. Cover mounting CD material on magazine or any publication.
10. Archiving material and forming free standing storage.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

What is claimed is:

1. A holder for a planar data storage medium, comprising:
a first opening through which the planar data storage medium is insertable into a storage area of the holder in an insertion direction within the plane of the planar data storage medium;
a retaining mechanism resiliently biased to resist removal of the planar data storage medium from the storage area in a direction opposite to the insertion direction;
the holder being configured to enable a pressure to be applied to the planar data storage medium to overcome the bias of the retaining mechanism, thereby allowing the planar data storage medium to be removed via the first opening in the holder;
the retaining mechanism comprising one or more protrusions resiliently biased to a blocking configuration in which the one or more protrusions project inwardly within the holder to restrict the passage of the planar data storage medium between the first opening and the storage area; and
each one or more protrusions being formed from two deformable strips of material, each deformable strip being located at one of its ends on an interior surface of the holder, whereas the other ends of the two deformable strips are separated from each other by a gap, the strips of material being deformable from the blocking configuration to a non-blocking configuration under insertion or removal pressure when contacted by the planar data storage medium to allow the planar data storage medium to move between the first opening and the storage area.

2. A holder as claimed in claim 1, wherein the deformable strips of material are strips of plastic material.

3. A holder as claimed in claim 1, wherein the one or more protrusions comprise two protrusions formed on opposing side walls of the holder.

4. A holder as claimed in claim 1, wherein the one or more protrusions are made of the same material as the holder, and form an integral part of the holder.

5. A holder as claimed in claim 1, wherein the holder is configured to provide a second opening for enabling a manual pressure to be applied to the planar data storage medium to overcome the bias of the retaining mechanism, thereby allowing the planar data storage medium to be removed via the first opening in the holder.

6. A holder as claimed in claim 1, wherein the first opening comprises a slot.

7. A holder as claimed in claim 1, further comprising a guide to guide the planar data storage medium along the insertion direction as it is inserted through the first opening.

8. A holder as claimed in claim 7, wherein the guide comprises one or more interior surfaces of the holder.

9. A holder as claimed in claim 7, wherein the guide comprises one or more shoulders arranged to act on an edge region of the planar data storage medium so as to maintain a gap between an information bearing region of the planar data storage medium and an interior surface of the holder.

10. A holder as claimed in claim 1, wherein the planar data storage medium is a CD or a CDROM.

11. A holder as claimed in claim 1, further comprising first and second complimentary coupling formations located on the exterior of the holder, such that a further holder having said first coupling formation can be coupled to the holder via said second coupling formation, and a further holder having said second coupling formation can be coupled to the holder via said first coupling formation.

12. A set of holders as claimed in claim 11, a first holder and a second holder in said set comprising said first and second complimentary coupling formations to enable the first and second holders to be locked together.

13. A holder for a planar data storage medium, comprising
 a first opening through which the planar data storage medium is insertable into a storage area of the holder in an insertion direction within the plane of the planar data storage medium;
 a retaining mechanism resiliently biased to resist removal of the planar data storage medium from the storage area in a direction opposite to the insertion direction;
 the holder being configured to enable a pressure to be applied to the planar data storage medium to overcome the bias of the retaining mechanism, thereby allowing the planar data storage medium to be removed via the first opening in the holder; and
 the retaining mechanism comprising one or more protrusions, each protrusion being formed as an integral part of an interior surface of the holder, and being resiliently biased to a blocking configuration in which the protrusion projects inwardly from the interior surface of the holder to restrict the passage of the planar data storage medium between the first opening and the storage area, each protrusion being arranged to change from the blocking configuration to a non-blocking configuration by application of said pressure to said planar data storage medium to allow the planar data storage medium to move between the first opening and the storage area;
wherein each one or more protrusions is formed from two deformable strips of material, each deformable strip being located at one of its ends on an interior surface of the holder, whereas the other ends of the two deformable strips are separated from each other by a gap, the strips of material being deformable from the blocking configuration to the non-blocking configuration under the insertion or removal pressure when contacted by the planar data storage medium.

* * * * *